(12) United States Patent
Takahashi et al.

(10) Patent No.: US 10,093,343 B2
(45) Date of Patent: Oct. 9, 2018

(54) STEERING DEVICE

(71) Applicant: YAMADA MANUFACTURING CO., LTD., Kiryu-shi (JP)

(72) Inventors: Ryosuke Takahashi, Kiryu (JP); Isao Fujiu, Kiryu (JP)

(73) Assignee: YAMADA MANUFACTURING CO., LTD., Kiryu-Shi, Gunma (JP)

( * ) Notice: Subject to any disclaimer, the term of this patent is extended or adjusted under 35 U.S.C. 154(b) by 0 days.

(21) Appl. No.: 15/602,282

(22) Filed: May 23, 2017

(65) Prior Publication Data

US 2017/0361864 A1 Dec. 21, 2017

(30) Foreign Application Priority Data

Jun. 21, 2016 (JP) .................................. 2016-122753

(51) Int. Cl.
*B62D 1/184* (2006.01)
*B62D 1/19* (2006.01)
*B62D 1/185* (2006.01)

(52) U.S. Cl.
CPC ............. *B62D 1/195* (2013.01); *B62D 1/184* (2013.01); *B62D 1/185* (2013.01); *B62D 1/192* (2013.01)

(58) Field of Classification Search
CPC ........ B62D 1/192; B62D 1/195; B62D 1/185; B62D 1/184
USPC .................................................... 74/492, 493
See application file for complete search history.

(56) References Cited

U.S. PATENT DOCUMENTS

| 7,607,694 | B2 * | 10/2009 | Shinohara | B62D 1/184 280/775 |
| 8,485,554 | B2 * | 7/2013 | Osuka | B62D 1/195 280/775 |
| 9,540,031 | B2 * | 1/2017 | Tagaya | B62D 1/184 |
| 9,789,897 | B2 * | 10/2017 | Yamamoto | B62D 1/192 |
| 2009/0174177 | A1 * | 7/2009 | Gerzseny | B62D 1/185 280/775 |
| 2009/0229399 | A1 * | 9/2009 | Ozsoylu | B62D 1/184 74/493 |
| 2012/0312117 | A1 * | 12/2012 | Maniwa | B62D 1/184 74/493 |
| 2015/0059512 | A1 * | 3/2015 | Kawakami | B62D 1/184 74/493 |

(Continued)

FOREIGN PATENT DOCUMENTS

JP 2005-001517 A 1/2005

*Primary Examiner* — Toan C To
(74) *Attorney, Agent, or Firm* — McGinn IP Law Group, PLLC

(57) ABSTRACT

A steering device according to the present invention has: a column pipe; a hanger bracket; an outer column that covers the column pipe in such a manner that the column pipe can move in a front-back direction; a fixed bracket that sandwiches the outer column; a fastening tool that has a bolt shaft and an operation lever portion, is inserted into a long hole of the hanger bracket, and locks and unlocks the outer column and the fixed bracket; a stopper member that is provided in the bolt shaft and swings as the bolt shaft rotates; and a telescopic regulating member that moves in the front-back direction together with the column pipe. The stopper member is capable of coming into abutment with the telescopic regulating member in an unlocked state but is not capable of coming into abutment with the telescopic regulating member in a locked state.

10 Claims, 8 Drawing Sheets

(56) References Cited

U.S. PATENT DOCUMENTS

2015/0232116 A1\* 8/2015 Yokota .................. B62D 1/192
  74/493
2015/0239490 A1\* 8/2015 Sakata .................. B62D 1/195
  74/493

\* cited by examiner

ENLARGED VIEW TAKEN ALONG ARROW Y1-Y1

ENLARGED VIEW OF (α) PART

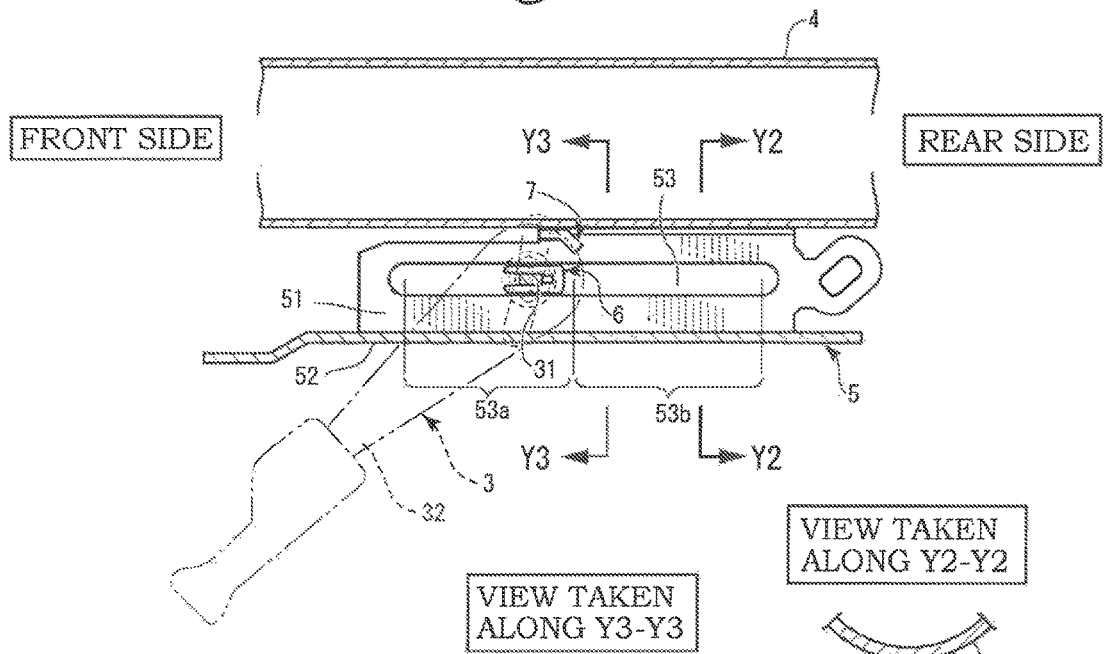
Fig.2A
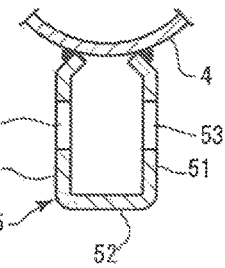
Fig.2B
Fig.2C
Fig.2D
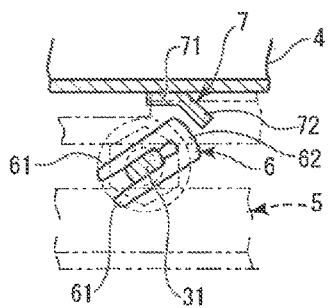
Fig.2E
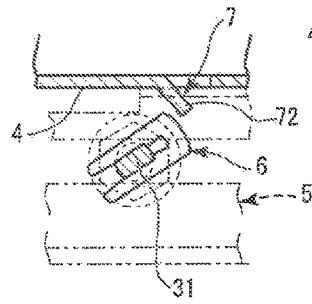
Fig.2F
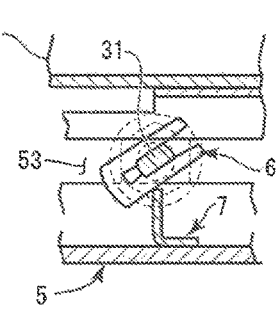
Fig.2G

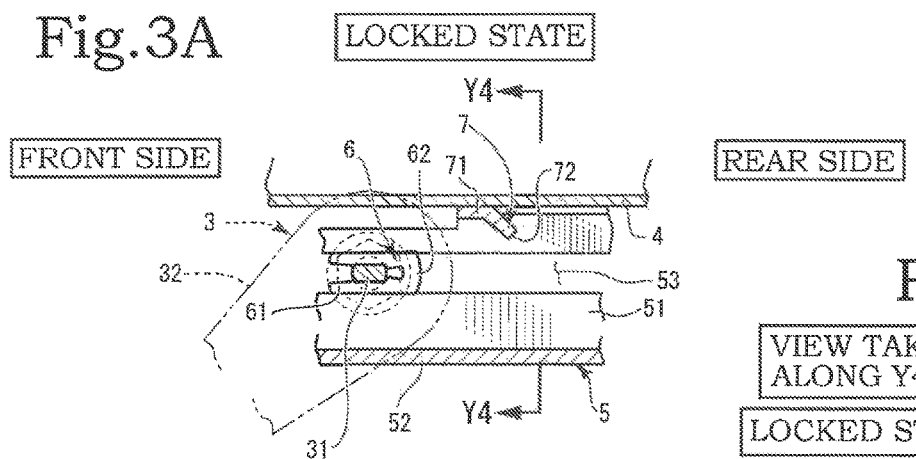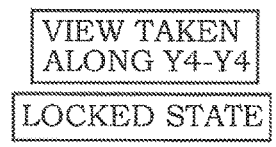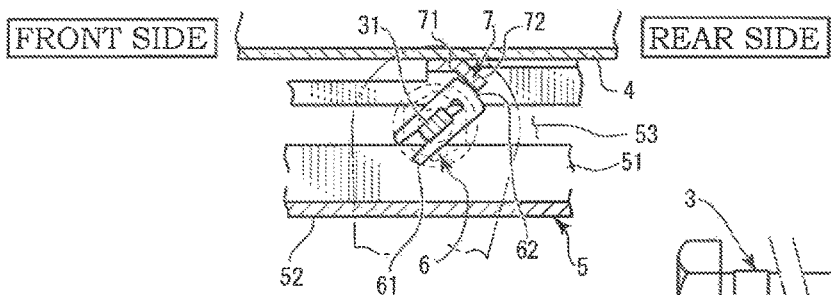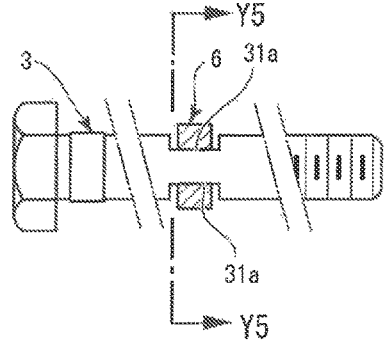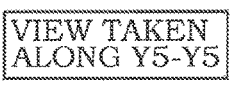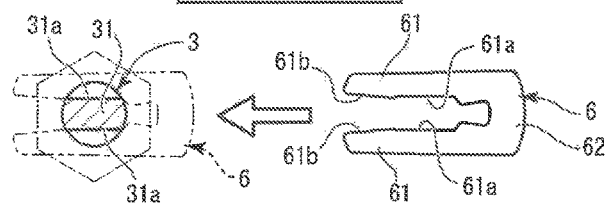

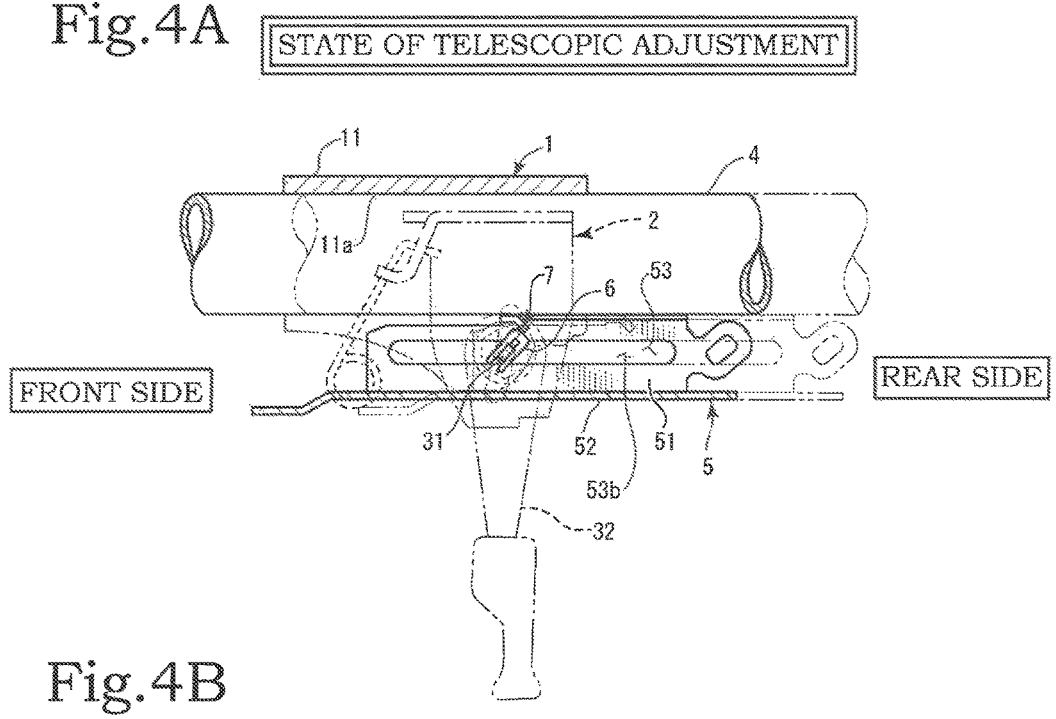
Fig.4A  STATE OF TELESCOPIC ADJUSTMENT
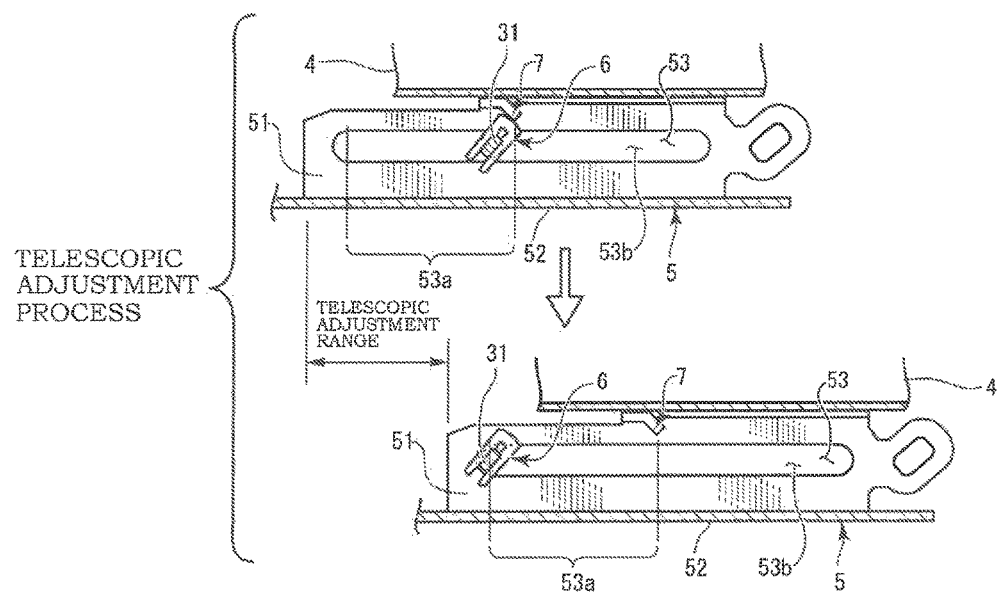
Fig.4B
TELESCOPIC ADJUSTMENT PROCESS
TELESCOPIC ADJUSTMENT RANGE

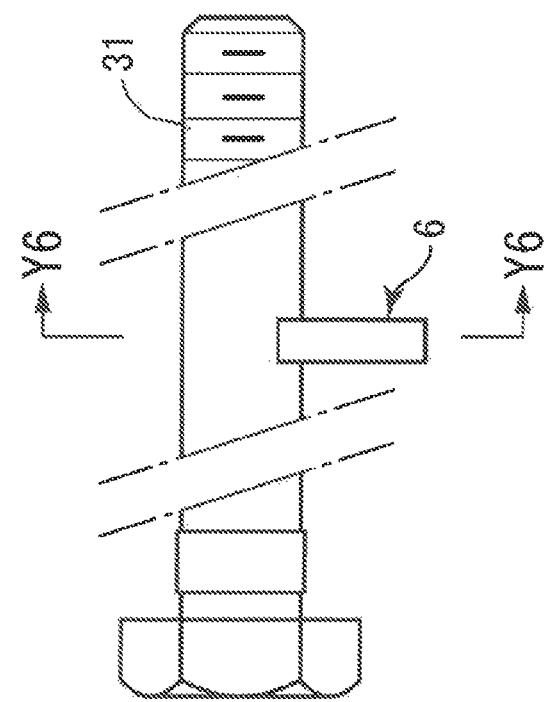
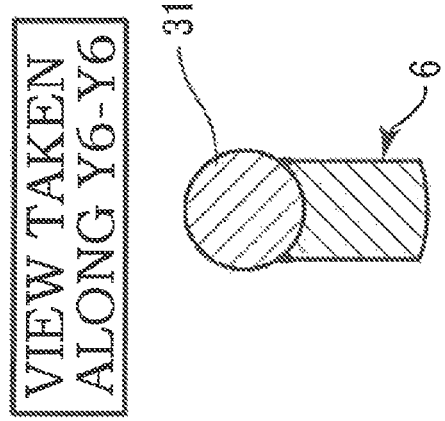

STEERING DEVICE

BACKGROUND OF THE INVENTION

1. Field of the Invention

The present invention relates to a steering device that is provided with a mechanism for regulating a telescopic adjustment range and is capable of operating independently without being affected by this telescopic mechanism at the time of an impact absorption operation performed upon a secondary collision.

2. Description of the Related Art

There have conventionally been various types of steering devices that are equipped with the telescopic adjustment mechanism and an impact absorber for protecting the driver upon a secondary collision. Examples of the prior art pertaining to such steering devices include Japanese Patent Application Laid-open No. 2005-1517. Below is a summary of Japanese Patent Application Laid-open No. 2005-1517. The explanation of Japanese Patent Application Laid-open No. 2005-1517 has the reference numerals in parentheses in order to differentiate itself from the explanation of the present invention.

The steering device according to Japanese Patent Application Laid-open No. 2005-1517 has one end of the link member (33) attached to the operation lever portion (20) and the other end of the link member (33) to the lower end of the limiting member (34) attached pivotally to the lower surface of the cylinder portion (21a) of the outer jacket (21).

The limiting portion (34a), formed at the upper end of the limiting member (34), can enter the cylinder portion (21a) through the opening (21g) formed in the lower portion of the cylinder portion (21a). In addition, the long hole (11f) is formed in the upper portion of the column pipe (11), and a tip end of the bolt (35) that is screwed to the upper portion of the outer jacket (21) is attached in a protruding manner to the inside of the long hole (11f).

In this state, the stretched limiting member (34) is tilted by the link member (33), and consequently the limiting portion (34a) located at the upper end of the limiting member (34) is pulled out of the opening (21g) of the outer jacket (21) (i.e., the limiting portion (34a) withdraws from the limiting position) and moves to a place to not come into abutment with the column pipe (11) (radially outward of the inner circumferential surface of the outer jacket (21)). For this reason, even in a case of a secondary collision where the driver collides with the steering wheel, not shown, due to a collision of the vehicle, the column pipe (11) can move (collapse) without hitting the limiting member (34).

Moreover, when the limiting member (34) pressed by the link member (33) stands upright and the limiting member (34) at the upper end protrudes inward from the opening (21g) of the outer jacket (21) (i.e., radially inward of the inner circumferential surface of the outer jacket (21)) (i.e., moves toward the limiting position), the column pipe (11) can come into abutment. Therefore, with the column pipe (11) being pushed toward the outer jacket (21) at the time of a telescopic adjustment, the end portion comes into abutment with the limiting member (34), causing the column pipe (11) to function as a telescopic stopper for preventing further displacement in the direction of contraction.

SUMMARY OF THE INVENTION

Japanese Patent Application Laid-open No. 2005-1517, unfortunately, has the following problems. First, the limiting member is configured to protrude from the opening of the cylinder portion of the outer jacket as a result of a rotation of the operation lever portion via the link member. The amount of protrusion changes depending on the rotation angle of the operation lever portion and a constant projection amount is rarely obtained, making parts dimension control complicated.

In addition, the limiting member becomes vertical as the operation lever portion rotates via the link member, and consequently protrudes from the opening of the cylinder portion of the outer jacket. This mechanism creates a risk where the limiting member is pushed back to withdrawal by the strong force of the inner shaft hitting the limiting member at the time of the telescopic adjustment, causing the limiting member to tilt. This might cause a deviation in the telescopic adjustment range.

In view of the above, an object of the present invention (the technical problem to be solved) is to provide a steering device that is provided with a mechanism for regulating the telescopic adjustment range and is capable of operating independently without being affected by this telescopic mechanism at the time of an impact absorption operation for absorbing the impact of a secondary collision. Another object of the present invention is to make the structure of the steering device extremely simple.

The inventors have accomplished the foregoing objects by contriving, through diligent study, a steering device as a first embodiment of the present invention, which has: a column pipe; a hanger bracket that is fixed to the column pipe and has a long hole along a front-back direction; an outer column that covers the column pipe in such a manner that the column pipe can move in the front-back direction; a fixed bracket that sandwiches the outer column; a fastening tool that has a bolt shaft and an operation lever portion, is inserted into the long hole of the hanger bracket, and locks and unlocks the outer column and the fixed bracket; a stopper member that is provided in the bolt shaft and swings as the bolt shaft rotates; and a telescopic regulating member that moves in the front-back direction together with the column pipe, wherein the stopper member is capable of coming into abutment with the telescopic regulating member in an unlocked state but is not capable of coming into abutment with the telescopic regulating member in a locked state.

The inventors have accomplished the foregoing objects by contriving a steering device as a second embodiment of the present invention, which has: a column pipe; an outer column that has a covering main body for covering the column pipe in such a manner that the column pipe can move in a front-back direction and a slit portion formed in the covering main body along the front-back direction; a fixed bracket that has fixed side portions for sandwiching the outer column, on respective sides in a width direction; a hanger bracket that has suspended plate-like portions, each having a long hole along the front-back direction, on respective sides in the width direction and that is fixed to the column pipe; a fastening tool that has a bolt shaft and an operation lever portion for rotating the bolt shaft, is inserted into the long holes of the hanger bracket, and locks and unlocks the outer column and the fixed bracket; a stopper member that is provided in the bolt shaft, swings as the bolt shaft rotates, and is disposed between the suspended plate-like portions; and a telescopic regulating member that is provided in either the hanger bracket or the column pipe, wherein the stopper member is configured to be able to come into abutment with the telescopic regulating member as the column pipe moves forward in an unlocked state, where a telescopic adjustment can be performed, obtained with the fastening tool, but the stopper member is positioned to not be able to come into abutment with the telescopic regulating member as the column pipe moves forward in a locked state.

The inventors have accomplished the foregoing objects by contriving a steering device as a third embodiment of the present invention, wherein, according to the steering device described in the first or second embodiment, the stopper member and the bolt shaft are configured as separate members and the stopper member is configured to be fittable and attachable to the bolt shaft.

The inventors have accomplished the foregoing objects by contriving a steering device as a fourth embodiment of the present invention, wherein, according to the steering device described in the first or second embodiment, the telescopic regulating member is formed in the hanger bracket. The inventors have accomplished the foregoing objects by contriving a steering device as a fifth embodiment of the present invention, wherein, according to the steering device described in the first or second embodiment, the telescopic regulating member is formed in the column pipe.

The inventors have accomplished the foregoing objects by contriving a steering device as a sixth embodiment of the present invention, wherein, according to the steering device described in the first or second embodiment, between the hanger bracket and the fastening tool of the outer column, an impact absorbing member is disposed, the impact absorbing member being provided with an impact absorbing plate portion that has a bolt insertion hole, through which the bolt shaft is inserted, and elasticity in a thickness direction, the impact absorbing plate portion being configured to come into abutment with the suspended plate-like portions of the hanger bracket in an elastically pressing manner in the locked state obtained with the fastening tool.

According to the present invention and the second embodiment, in the unlocked state obtained with the fastening tool where a telescopic adjustment can be performed, the stopper member is positioned to be able to come into abutment with the telescopic regulating member, but the stopper member is positioned to not be able to come into abutment with the telescopic regulating member in the locked state. Therefore, in the locked state as well as in a secondary collision where the driver hits the steering wheel, the stopper member and the telescopic regulating member cannot come into abutment with each other when the column pipe and the hanger bracket move forward. Consequently, smooth, stable load characteristics can be achieved without having the stopper member and the telescopic regulating member collide with each other or without generating a butting load. In addition, while having these effects, the present invention is configured to only have the stopper member and the telescopic regulating member. Owing to such an extremely simple configuration with a lower number of parts, the steering device of the present invention can be provided at low cost.

BRIEF DESCRIPTION OF THE DRAWINGS

FIG. 2A is an enlarged plane view of the main parts, showing the configurations of the column pipe, the hanger bracket, the stopper member, and the telescopic regulating member of the present invention, FIG. 2B is an enlarged cross-sectional diagram taken along the arrow Y2-Y2 of FIG. 2A, FIG. 2C is an enlarged cross-sectional diagram taken along the arrow Y3-Y3 of FIG. 2A, FIG. 2D is an enlarged perspective view of the telescopic regulating member provided in the hanger bracket, FIG. 2E is a cross-sectional diagram of the main parts, showing another embodiment of the telescopic regulating member, FIG. 2F is a cross-sectional diagram of the main parts, showing yet another embodiment of the telescopic regulating member, and FIG. 2G is a cross-sectional diagram of the main parts, showing yet another embodiment of the telescopic regulating member;

FIG. 3A is an enlarged side view of the main parts, showing the stopper member, the telescopic regulating member, and the vicinity thereof in the locked state, FIG. 3B is an enlarged cross-sectional diagram of the main parts, showing the backs of the stopper member, the telescopic regulating member, and the vicinity thereof in the locked state, FIG. 3C is an enlarged side view of the main parts, showing partial cross sections of the stopper member, the telescopic regulating member, and the vicinity thereof in the unlocked state, FIG. 3D is an enlarged view showing a partial cross section and a cutaway of a bolt shaft to which the stopper member is fitted and attached, and FIG. 3E is an enlarged view taken along the arrow Y5-Y5 of FIG. 3D, showing the bolt shaft and the stopper member separated from each other;

FIG. 4A is a plane view of the main parts when a telescopic adjustment is performed, and FIG. 4B is a plane view of the main parts, showing a telescopic adjustment process;

FIG. 6A is an enlarged side view of the bolt shaft provided with the stopper member of another embodiment, and FIG. 6B is a cross-sectional diagram taken along the arrow Y6-Y6 of FIG. 6A;

DESCRIPTION OF THE PREFERRED
EMBODIMENTS

Embodiments of the present invention are now described hereinafter with reference to the drawings. The wording that indicates the directions mentioned in the present invention includes the front side, the rear side, and the front-back direction. The front side and the rear side represent areas based on the front-back direction of an automobile with the steering device of the present invention attached thereto. Specifically, of the components of the steering device, the front wheels of the automobile are located on the front side and the steering wheel on the rear side of the automobile.

Figure 1A:
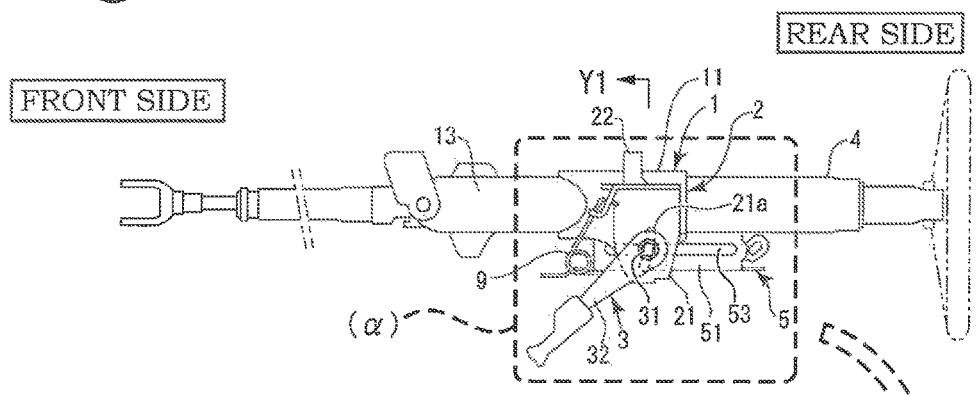
FIG. 1A is a side view of the present invention.
Figure 1B:
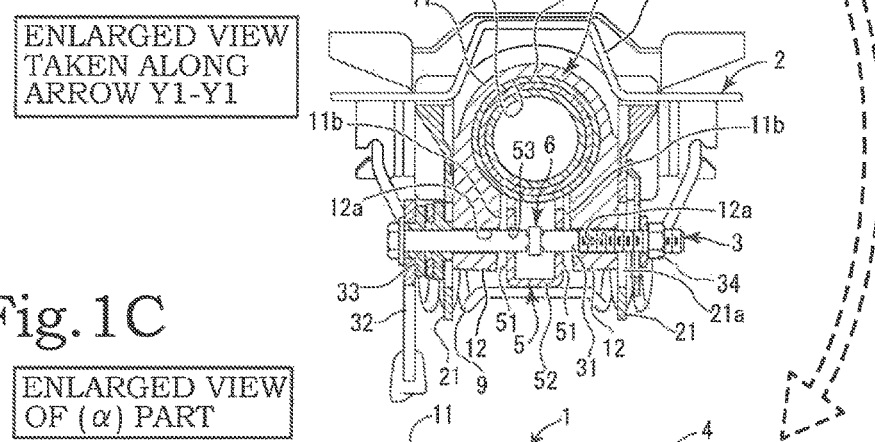
FIG. 1B is an enlarged cross-sectional diagram taken along the arrow Y1-Y1 of FIG. 1A.
Figure 1C:
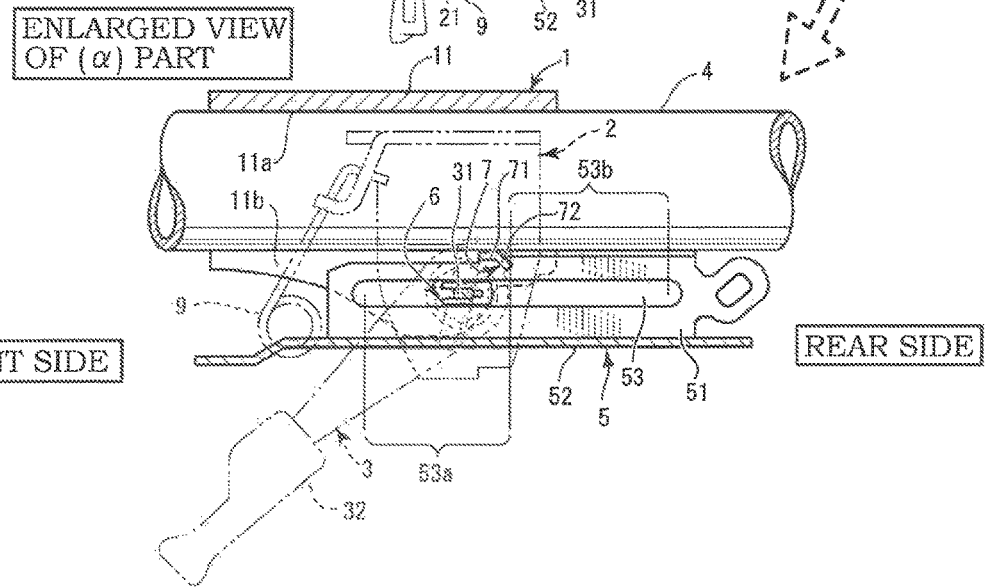
FIG. 1C is an enlarged cross-sectional diagram of a part of the (a) part shown in of FIG. 1A.

As shown in mainly FIGS. 1A to 1C, the present invention mainly has an outer column 1, a fixed bracket 2, a fastening tool 3, a column pipe 4, a hanger bracket 5, a stopper member 6, and a telescopic regulating member 7. The outer column 1 is configured with a covering main body 11 and fastening portions 12. The covering main body 11 is roughly in the shape of a cylinder with a hollow interior portion. Specifically, the interior portion of the cylindrical covering main body 11 has a hollow-shaped covering inner circumferential surface portion 11a. Slit portions 11b are formed on the diametrically lower side of the covering main body 11 (see FIGS. 1B and 1C).

The slit portions 11b are the sections that extend from the front side of the axial direction of the covering main body 11 to the rear side and are separated from each other in the width direction. As the edge sections of the slit portions 11b facing each other in the width direction come close to each other, the diameter of the covering inner circumferential surface portion 11a becomes short and the column pipe 4 stored in and attached to the covering main body 11 becomes tightened, locking the steering wheel. When the steering wheel is in the unlocked state as well as in the telescopically adjustable state, the covering inner circumferential surface portion 11a of the covering main body 11 becomes slightly larger than the outer diameter of the column pipe 4 so that the column pipe 4 can slide easily.

The fastening portions 12 are integrally formed at a lower part of the outer column 1 (see FIG. 1B). The fastening portions 12 are the thick, plate-like sections that are in a bilaterally symmetrical shape, formed integrally at the respective width-wise ends of the slit portions 11b, and suspended roughly from the width-wise ends of the slit portions 11b or from the vicinity thereof. Fastening throughholes 12a are formed in the fastening portions 12, through which a bolt shaft 31 of the fastening tool 3, which is described hereinafter, is inserted. An arm portion 13 is formed at the front side of the covering main body 11 in the front-back direction. The arm portion 13 is configured to have two forked arm-like portions.

Next, the fixed bracket 2 is configured with fixed side portions 21 formed at the width-wise ends thereof, and an attachment top portion 22. Tilted long holes 21a extending roughly in the perpendicular direction or vertical direction are formed in both of the fixed side portions 21 (see FIGS. 1A and 1B). The fastening tool 3 has the bolt shaft 31, an operation lever portion 32, a fastening cam 33, and a nut 34 (see FIGS. 1A, 1B, and the like). The column pipe 4 has a steering shaft installed in the interior thereof, wherein the steering wheel is attached to the tip of the steering shaft that protrudes from the rear side of the column pipe 4.

Next, the hanger bracket 5 is configured with two suspended plate-like portions 51 and a bottom plate portion 52 (see FIGS. 1A to 1C, and FIGS. 2A to 2G). The suspended plate-like portions 51 of the hanger bracket 5 configure the width-wise side portions of the hanger bracket 5, extend in the front-back direction of the column pipe 4, and are disposed in such a manner as to be in parallel to each other with a predetermined space therebetween at the diametrically lower side of the column pipe 4. Upper ends of the suspended plate-like portions 51 of the hanger bracket 5 are fixed to the diametrically lower side of the column pipe 4 by fixing means such as welding (see FIGS. 2A and 2B). The bottom plate portion 52 is formed on lower ends of the suspended plate-like portions 51, and the cross sections of the suspended plate-like portions 51 and the bottom plate portion 52 that meet at right angles in the longitudinal direction are formed roughly into the shape of an inverted gate or an angled U-shape (see FIG. 1B, FIGS. 2A to 2G, and the like).

A long hole 53 extending along the front-back direction is formed in each of the suspended plate-like portion 51. Each of the long holes 53 plays two roles, divided in the front-back direction. The front region of each long hole 53 configures a telescopic long hole 53a and the rear region an impact absorbing long hole 53b (see FIG. 1C). The telescopic long hole 53a is the region used for telescopic adjustment. The impact absorbing long hole 53b is the region used for absorbing the impact generated in a secondary collision, and this is the region where each long hole 53 and the bolt shaft 31 inserted into the long hole 53 move relatively.

The stopper member 6 is a member that, together with the telescopic regulating member 7 described hereinafter, functions to regulate, to a predetermined range, the movement of the column pipe 4 in the front-back direction when a telescopic adjustment is performed. The stopper member 6 is attached to the bolt shaft 31 of the fastening tool 3. The stopper member 6 swings on a vertical plane by a rotation of the bolt shaft 31 in the shaft circumferential direction caused by a turning operation on the operation lever portion 32 (see FIGS. 3A and 3C). The stopper member 6 is made of metal and configured with two sandwiching pieces 61 and a connecting portion 62 that connects these sandwiching pieces 61 by the ends thereof, wherein these components are each roughly shaped into a U-shape or flattened C-shape (see FIG. 3E).

The sandwiching pieces 61 are in a bilaterally symmetrical forked shape, and sandwiching surfaces 61a are formed in the middle sections on opposing surfaces of the sandwiching pieces 61 (see FIG. 3E). The sandwiching surfaces 61a are provided in such a manner as to face each other with an appropriate distance therebetween and are formed into flat, parallel surfaces. In addition, fitting guide surfaces 61b are formed in the vicinity of the longitudinal ends of the sandwiching pieces 61 (on the side opposite to the position of the connecting portion 62). The fitting guide surfaces 61b are roughly formed into a V-shape in such a manner as to tilt as if the space therebetween gradually narrows down toward the positions of the sandwiching surfaces 61a.

Sandwiched surface portions 31a are formed in the axially middle sections on the bolt shaft 31 of the fastening tool 3 (see FIGS. 3D and 3E). The sandwiched surface portions 31a are flat and parallel, and the sandwiching surfaces 61a are held by the sandwiching pieces 61 of the stopper member 6 so as to abut with the sandwiching surfaces 61a in a pressing manner.

The distance between the sandwiching surfaces 61a is slightly shorter than the distance between the sandwiched surface portions 31a of the bolt shaft 31, so that the sandwiching surfaces 61a can hold the sandwiched surface portions 31a in a pressing manner by simply placing the sandwiching pieces 61 on the sandwiched surface portions 31a.

In another embodiment of the stopper member 6, the stopper member 6 is fixed to the bolt shaft 31 directly by fixing means such as welding (see FIGS. 6A and 6B). According to this embodiment, the bolt shaft 31 is simply provided with the stopper member 6 without being machined. In order to be disposed between the suspended plate-like portions 51 of the hanger bracket 5 along with the bolt shaft 31, the stopper member 6 needs to have a shape and size so as to be able to pass through the long hole 53. In this embodiment, therefore, the stopper member 6 is formed into a rectangular plate, wherein the length of the short sides of the rectangular plate is set to be shorter than the perpendicular length of the long hole 53.

The stopper member 6 is fixed tightly to the bolt shaft 31 so as not to idle in the shaft circumferential direction, but the stopper member 6 is swung by a rotation of the bolt shaft 31. The stopper member 6 is configured in such a manner that in the state in which the stopper member 6 is attached to the bolt shaft 31, the longitudinal direction of the stopper member 6 is orthogonal to the axial direction of the bolt shaft 31. The longitudinal end of the stopper member 6 that is away from the bolt shaft 31, which, in other words, is the connecting portion 62, changes the level thereof in the perpendicular direction with respect to the position of the core of the bolt shaft 31 as the stopper member 6 swings (see FIGS. 3A to 3C).

Next, the telescopic regulating member 7 is a member that serves to set a terminal end position especially on the rear side of the range of movement in which the column pipe 4 moves in the front-back direction for a telescopic adjustment. The telescopic regulating member 7 protrudes from an upper portion of the hanger bracket 5 toward the middle of the hanger bracket 5 in the perpendicular direction (see FIGS. 2A, 2C, 2D, and the like).

The telescopic regulating member 7 protrudes in a way that it does not come into abutment with or interfere with the relatively moving bolt shaft 31 of the fastening tool 3 when the column pipe 4 and the hanger bracket 5 move in the front-back direction, but comes into abutment with the stopper member 6 at the time of unlocking (see FIGS. 3A to 3C).

The telescopic regulating member 7 is formed at the upper end section of either one of the suspended plate-like portions 51 of the hanger bracket 5 (see FIGS. 2A, 2C, and 2D). Specifically, a part of the upper end of the suspended plate-like portion 51 extends inward in the width direction of the hanger bracket 5, forming a bent piece 71, and one side of this bent piece 71 extends downward, forming an abutting piece 72 (see FIGS. 2A, 2C, and 2D). The abutting piece 72 is formed to be inclined or at right angle with respect to the front-back direction of the hanger bracket 5.

In another embodiment of the telescopic regulating member 7, the telescopic regulating member 7 is provided at the diametrically lower end of the column pipe 4. According to this embodiment, the telescopic regulating member 7 provided as a member separate from the column pipe 4 is fixed to the column pipe 4 by welding or the like (see FIG. 2E). In yet another embodiment, a cutout part is formed at the diametrically lower end of the column pipe 4 and then the telescopic regulating member 7 is formed by bending this cutout part downward (see FIG. 2F). There is also another embodiment in which the telescopic regulating member 7 is provided as a member separate from the bottom plate portion 52 of the hanger bracket 5 and is fixed to the bottom plate portion 52 by welding or the like (see FIG. 2G).

Next is described an energy absorption operation of the steering device of the present invention, which is performed at the time of a telescopic adjustment and a secondary collision. The telescopic adjustment is described first. The unlocked state of the steering device is achieved by rotating the operation lever portion 32 of the fastening tool 3 (see FIG. 3C and FIG. 4A). In this unlocked state, the longitudinal direction of the stopper member 6 attached to the bolt shaft 31 is tilted with respect to the front-back direction of the hanger bracket 5 (see FIG. 3C and FIG. 4A).

Therefore, when the column pipe 4 and the hanger bracket 5 move in the front-back direction, the stopper member 6 and the telescopic regulating member 7 can come into abutment with each other (see FIGS. 4A, 4B, and the like). As a result, the terminal end position on the rear side of the telescopic adjustment range is set (see FIG. 4B). Furthermore, a terminal end position on the front side of the telescopic adjustment range corresponds to a front end portion of the long hole 53. In other words, the space between the front end portion of the long hole 53 and the telescopic regulating member 7 corresponds to approximately the telescopic adjustment range (see FIG. 4B).

Figure 5A:
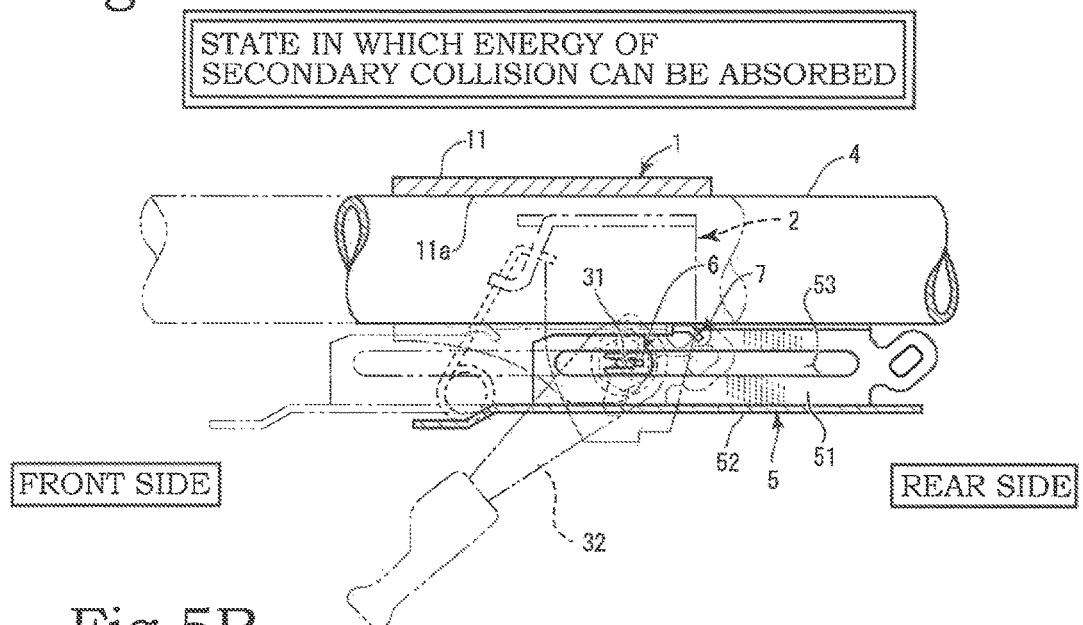
FIG. 5A is a plane view of the main parts, showing how the energy of a secondary collision can be absorbed.

The state of the steering device in a secondary collision is described next. First of all, once the position of the steering wheel is established by the telescopic adjustment, the operation lever portion 32 of the fastening tool 3 is rotated to lock the steering device. At this moment, the longitudinal direction of the stopper member 6 attached to the bolt shaft 31 is set to be parallel to the front-back direction of the hanger bracket 5 (see FIG. 3A and FIG. 5A). In other words, when a secondary collision occurs, the energy thereof can be absorbed.

Figure 5B:
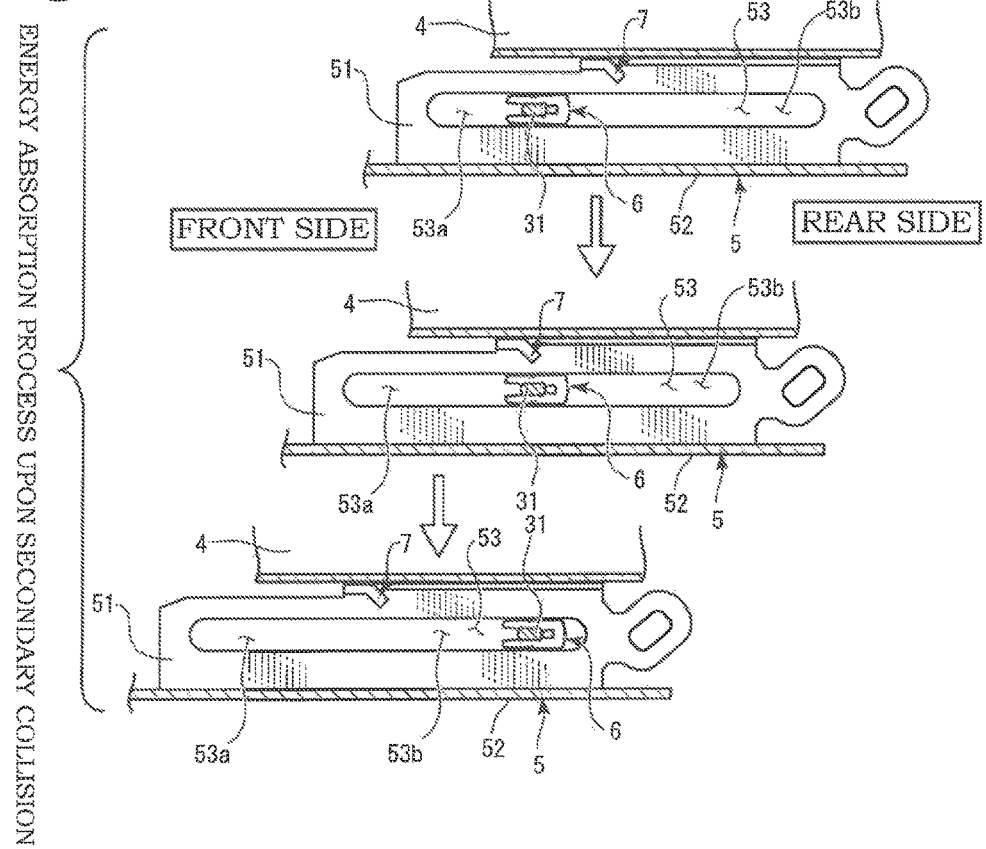
FIG. 5B is a plane view of the main parts, showing an energy absorption process that takes place upon a secondary collision.

Specifically, the longitudinal direction of the stopper member 6 is set to be parallel to the longitudinal direction of the long hole 53 of the hanger bracket 5. This establishes the configuration in which, when the column pipe 4 and the hanger bracket 5 move in the front-back direction, the stopper member 6 and the telescopic regulating member 7 separate from each other while keeping an appropriate distance and therefore cannot come into abutment with each other (see FIG. 5B).

In this case, at the time the secondary collision, the stopper member 6 and the telescopic regulating member 7 do not come into abutment with each other when the column pipe 4 and the hanger bracket 5 move to the front side. Therefore, the energy of the collision can be absorbed by a constant load regardless of the telescopic position. At the time of the secondary collision, the energy thereof is absorbed by the frictional force generated between the covering inner circumferential surface portion 11a of the outer column 1 and the column pipe 4. Also, an elastic member 9 is provided between the outer column 1 and the fixed bracket 2 (see FIGS. 1A to 1C, and FIG. 7A). The elastic member 9 serves to stably support the hanger bracket 5, an impact absorbing member 8, or the like, which is described hereinafter, by coming into abutment therewith.

Figure 7B:
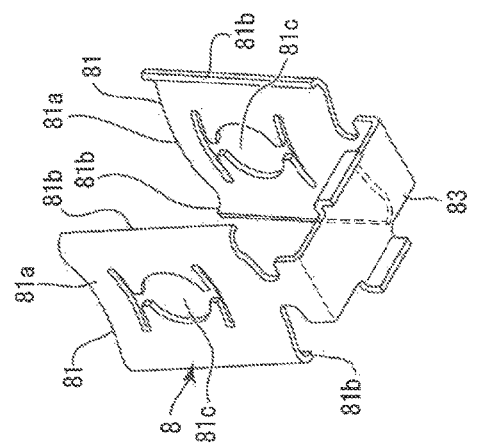
FIG. 7B is a perspective view of the impact absorbing member.
Figure 7A:
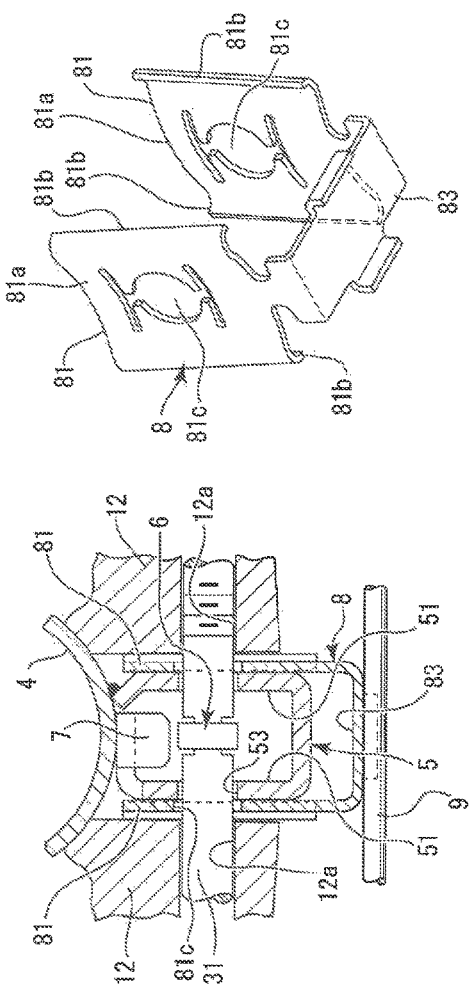
FIG. 7A is a cross-sectional diagram of the main parts, showing an embodiment of the present invention in which the impact absorbing member is provided between the fastening portion of the outer column and the hanger bracket.
Figure 7C:
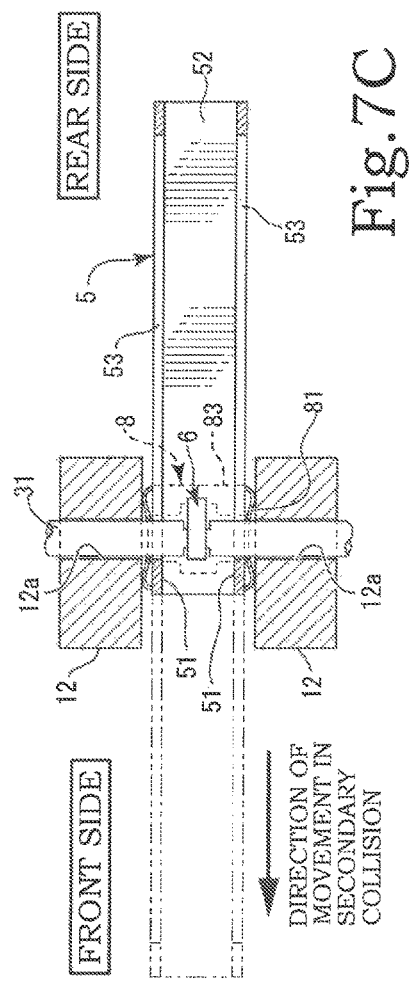
FIG. 7C is a cross-sectional plan view of the main parts.

The present invention has an embodiment in which the steering device is provided with the impact absorbing member 8 (see FIGS. 7A to 7C). The impact absorbing member 8 is made out of metal and is basically configured with two impact absorbing plate portions 81 (see FIG. 7B). Each of the impact absorbing plate portions 81 is configured with an elastic plate portion 81a and a pawl portion 81b. The cross section of the elastic plate portion 81a is roughly curved or shaped into an arc, and the pawl portions 81b are formed on either ends of the elastic plate portion 81a in terms of the front-back direction.

Each elastic plate portion 81a has a bolt insertion hole 81c formed therein, through which the bolt shaft 31 of the fastening tool 3 passes (see FIGS. 7A and 7B). The impact absorbing member 8 is configured in such a manner that the two impact absorbing plate portions 81 are provided bilaterally symmetrical and a coupling plate portion 83 is formed at the lower ends of the impact absorbing plate portions 81. The distance between the impact absorbing plate portions 81 is wider between the upper ends thereof than between the lower ends where the coupling plate portion 83 is formed.

In other words, the impact absorbing plate portions 81 are not perpendicular to the coupling plate portion 83 but configured in such a manner that the upper ends thereof spread outward in the width direction and the cross sections of the impact absorbing plate portions 81 perpendicular to the front-back direction are roughly in a trapezoidal shape. Therefore, when assembling the steering device of the present invention, the space between the upper ends of the impact absorbing plate portions 81 of the impact absorbing member 8 is narrowed down and in this state the impact absorbing member 8 is inserted between the fastening portions 12 of the outer column 1 and the suspended plate-like portions 51 of the hanger bracket 5 (see FIGS. 7A, 7B). The pawl portions 81b of each impact absorbing plate portion 81 face the suspended plate-like portions 51 of the hanger bracket 5. In the unlocked state, the pressures from the fastening portions 12 and the suspended plate-like portions 51 of the hanger bracket 5 are not applied to the impact absorbing plate portions 81 of the impact absorbing member 8.

In other words, in a tilt-telescopically adjustable state, no loads are applied to the impact absorbing plate portions 81. Therefore, the space between the upper ends of the impact absorbing plate portions 81 becomes wide, the pawl portions 81b separate from the suspended plate-like portions 51 of the hanger bracket 5, and therefore the impact absorbing member 8 is not in abutment with the suspended plate-like portions 51. Because the impact absorbing member 8 does not come into abutment with the suspended plate-like portions 51 of the hanger bracket 5 due to the wide space between the upper ends of the impact absorbing plate portions 81, the column pipe 4 and the hanger bracket 5 can implement tilt telescopic movement smoothly.

In the locked state, on the other hand, the pressures from the fastening portions 12 and the suspended plate-like portions 51 of the hanger bracket 5 are applied to the impact absorbing plate portions 81 of the impact absorbing member 8. In other words, a load from the external force is imposed on each of the impact absorbing plate portions 81 in the thickness direction thereof. At this moment, the fact that the inner surfaces of the fastening portions 12 and the suspended plate-like portions 51 of the hanger bracket 5 come close to each other leads to application of pressure to the impact absorbing plate portions 81, elastically deforming the impact absorbing plate portions 81 in such a manner that the space between the upper ends of the elastic plate portions 81a closes, and causing the pawl portions 81b to come into abutment with the suspended plate-like portions 51 of the hanger bracket 5 with pressure.

In the locked state, the sum of the frictional force generated between the covering inner circumferential surface portion 11a of the outer column 1 and the column pipe 4 and the frictional force generated between the impact absorbing member 8 and the hanger bracket 5 is an energy absorbing load imposed to absorb the energy of a secondary collision. As a result of the addition of the frictional force generated by the impact absorbing member 8 to the frictional force between the column pipe 4 and the outer column 1 in the locked state, the energy absorbing load for absorbing the energy of a secondary collision can be increased from the initial amount regardless of the position in the telescopic adjustment range. Then, when a secondary collision occurs, the pawl portions 81b of the impact absorbing plate portions 81 of the impact absorbing member 8 come into abutment with the suspended plate-like portions 51 of the hanger bracket 5 with pressure, and the resultant frictional force therebetween can keep approximately constant an impact absorbing load that is brought about by the movement of the hanger bracket 5 with respect to the unmoving outer column 1 in the front-back direction (axial direction).

When the bolt shaft 31 moves in the long hole 53 of the hanger bracket 5 at the time of a secondary collision, the impact absorbing member 8 moves relative to the bolt shaft 31 while keeping the aforementioned frictional force. The pawl portions 81b, 81b of the impact absorbing plate portions 81, 81 come into abutment with the suspended plate-like portions 51 of the hanger bracket 5. The outer column 1 does not move in relation to the vehicle body, while the hanger bracket 5 and the column pipe 4 move in the front-back direction of the vehicle body at the time of the telescopic adjustment and secondary collision. The impact absorbing member 8 does not move due to the outer column 1 and the fastening tool 3. For this reason, the hanger bracket 5 and the impact absorbing member 8 move relative to each other.

In the locked state, the pawl portions 81b of the impact absorbing plate portions 81 of the impact absorbing member 8 come into abutment with the suspended plate-like portions 51 of the hanger bracket 5, wherein the pawl portions 81b strongly come into contact with the suspended plate-like portions 51 in such a manner as to bite into the suspended plate-like portions 51, applying a concentrated load to the suspended plate-like portions 51. Concretely, the sections on the suspended plate-like portions 51 that are in abutment with the pawl portions 81b become scraped off or dented due to the secondary collision.

Consequently, the resistance of impact absorption taking place upon the secondary collision increases even more. As a result, the length of the long hole 53 formed in the hanger bracket 5 can be reduced, as well as the lengths of the hanger bracket 5 and the column pipe 4, reducing the size of the entire steering device. The load of the pawl portions 81b imposed on the suspended plate-like portions 51 can appropriately be changed by changing the thickness, shape, and angle of the pawl portions 81b.

According to the foregoing configuration, as with the impact absorbing member 8 having the coupling plate portion 83, the impact absorbing plate portions 81, which are independent members, have the pawl portions 81b thereof coming into abutment with the respective suspended plate-like portions 51 of the hanger bracket 5 in a fastened state. When a secondary collision occurs, the suspended plate-like portions 51 move forward while the pawl portions 81b strongly come into contact with the suspended plate-like portions 51 in such a manner as to bite into the suspended plate-like portions 51, generating a high energy absorbing load.

Figure 8:
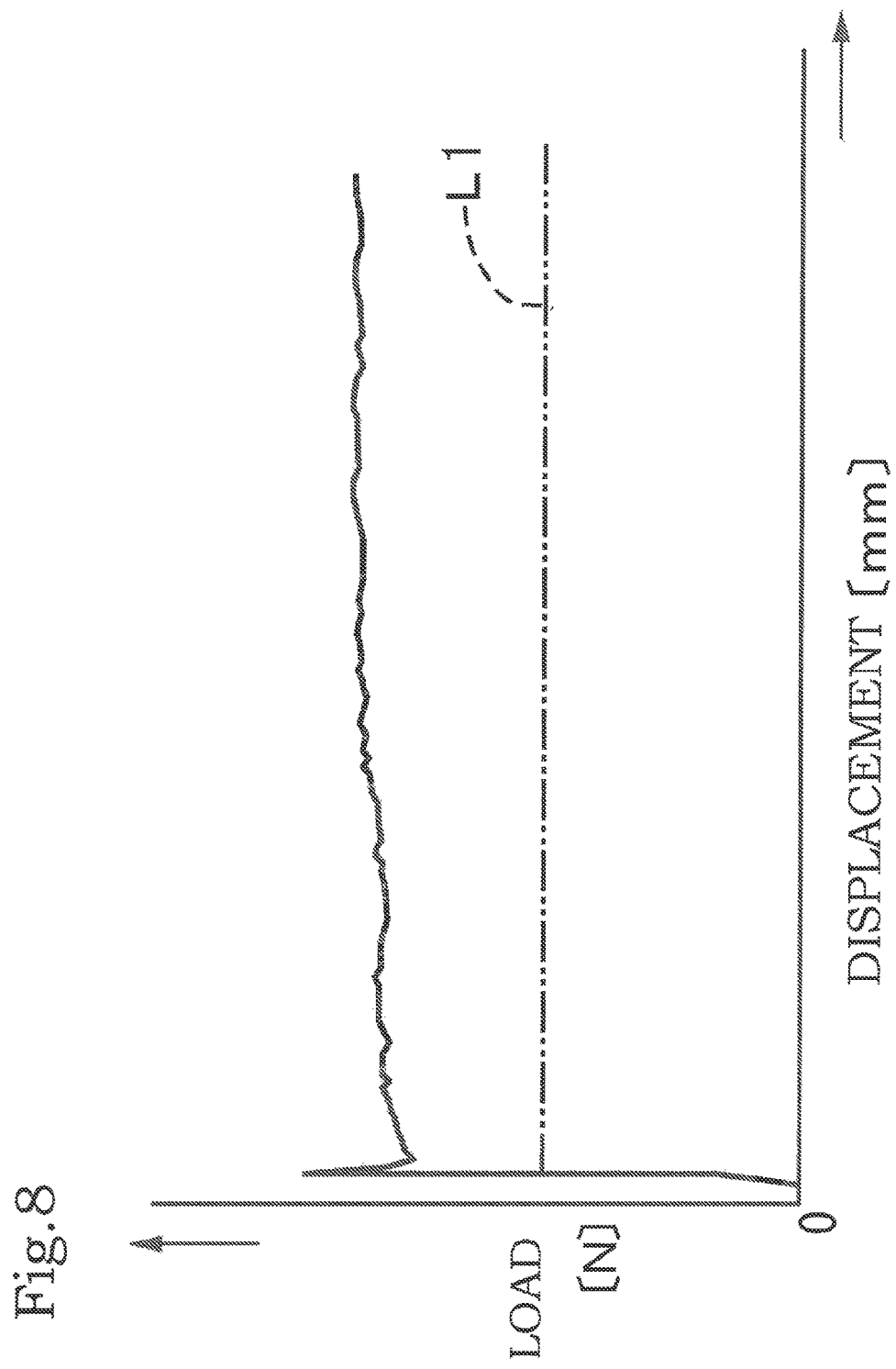
FIG. 8 is a graph showing the characteristics of the present invention.

Accordingly, in the steering device of the present invention, the impact energy can be absorbed not only by the frictional load between the outer column 1 and the column pipe 4 but also by the frictional load between the hanger bracket 5 and the impact absorbing member 8. FIG. 8 is a graph showing the characteristics of the present invention. Specifically, FIG. 8 is a graph representing energy absorbing loads and energy absorption strokes. In this graph, the section below the two-dot chain line L1 represents the amount of energy absorbed by the frictional load between the outer column 1 and the column pipe 4, and the section above the two-dot chain line L1 represents the amount of energy absorbed by the frictional load between the hanger bracket 5 and the impact absorbing member 8.

The structure for absorbing an impact using only the frictional load between the outer column 1 and the column pipe 4 is considered to be able to increase the amount of impact energy absorbed by increasing the retention force of the column pipe 4 in the covering main body 11. In this case, however, it is difficult to adjust the energy absorbing load due to an increase in the load generated by operating the operation lever portion 32, and therefore it is difficult to comply with vehicles requiring high energy absorbing loads. However, according to the present invention, the frictional load between the hanger bracket 5 and the impact absorbing member 8 is added, and therefore the present invention can comply with vehicles requiring high energy absorbing loads, while ensuring the operability of the operation lever portion 32.

According to the second embodiment, the outer column in particular is configured to have a covering main body for covering the column pipe in such a manner that the column pipe can move in the front-back direction, and a slit portion formed in the covering main body along the front-back direction. Therefore, the column pipe, hanger bracket, stopper member, telescopic regulating member and the like can easily be stored and disposed in appropriate positions in the covering main body and slit portion of the outer column, making the entire device into a compact, tidy configuration. With this configuration, different operations for performing a telescopic adjustment and absorbing the energy of a secondary collision can be carried out more accurately and reliably.

According to the third embodiment, the stopper member and the bolt shaft are configured as separate members, the stopper member being fittable and attachable to the bolt shaft. Thus, when incorporating the fastening tool in the hanger bracket, the stopper member can be attached to the bolt shaft after passing the bolt shaft through the long hole of the hanger bracket. Therefore, welding does not need to be performed in order to join the bolt shaft and the stopper member, making the assembling work easy and improving the work efficiency.

According to the fourth embodiment, the telescopic regulating member is formed in the hanger bracket. Thus, the long hole and the telescopic regulating member can be incorporated in the hanger bracket at the same time, eliminating the need to perform high-quality dimensional control for joining the hanger bracket and the column pipe, and improving the work efficiency. According to the fifth embodiment, the telescopic regulating member is formed in the column pipe, increasing the freedom of manufacturing.

According to the sixth embodiment, between the hanger bracket and the fastening portions of the outer column, the bolt insertion hole through which the bolt shaft is inserted is formed and the impact absorbing member that has the impact absorbing plate portions having elasticity in the thickness direction is disposed. In the locked state achieved with the fastening tool, the impact absorbing plate portions are configured to come into abutment with the suspended plate-like portions of the hanger bracket in an elastically pressing manner. As a result, the energy of the sliding load between the outer column and the column pipe and the energy of the frictional load generated by the impact absorbing member can be absorbed. Therefore, efficient energy absorption can be accomplished with smaller spaces.

What is claimed is:

1. A steering device, comprising:
   a column pipe;
   a hanger bracket that is fixed to the column pipe and has a long hole along a front-back direction;
   an outer column that covers the column pipe in such a manner that the column pipe can move in the front-back direction;
   a fixed bracket that sandwiches the outer column;
   a fastening tool that has a bolt shaft and an operation lever portion, is inserted into the long hole of the hanger bracket, and locks and unlocks the outer column and the fixed bracket;
   a stopper member that is provided in the bolt shaft and swings as the bolt shaft rotates; and
   a telescopic regulating member that moves in the front-back direction together with the column pipe, wherein
   the stopper member is capable of coming into abutment with the telescopic regulating member in an unlocked state but is not capable of coming into abutment with the telescopic regulating member in a locked state.

2. A steering device, comprising:
   a column pipe;
   an outer column that has a covering main body for covering the column pipe in such a manner that the column pipe can move in a front-back direction and a slit portion formed in the covering main body along the front-back direction;
   a fixed bracket that has fixed side portions for sandwiching the outer column, on respective sides in a width direction;
   a hanger bracket that has suspended plate-like portions, each having a long hole along the front-back direction, on respective sides in the width direction and that is fixed to the column pipe;
   a fastening tool that has a bolt shaft and an operation lever portion for rotating the bolt shaft, is inserted into the long holes of the hanger bracket, and locks and unlocks the outer column and the fixed bracket;
   a stopper member that is provided in the bolt shaft, swings as the bolt shaft rotates, and is disposed between the suspended plate-like portions; and
   a telescopic regulating member that is provided in either the hanger bracket or the column pipe, wherein
   the stopper member is configured to be able to come into abutment with the telescopic regulating member as the column pipe moves forward in an unlocked state, where a telescopic adjustment can be performed, obtained with the fastening tool but the stopper member is positioned to not be able to come into abutment with the telescopic regulating member as the column pipe moves forward in a locked state.

3. The steering device according to claim 1, wherein the stopper member and the bolt shaft are configured as separate members and the stopper member is configured to be fittable and attachable to the bolt shaft.

4. The steering device according to claim 1, wherein the telescopic regulating member is formed in the hanger bracket.

5. The steering device according to claim 1, wherein the telescopic regulating member is formed in the column pipe.

6. The steering device according to claim 1, wherein between the hanger bracket and the fastening tool of the outer column, an impact absorbing member is disposed, the impact absorbing member being provided with an impact absorbing plate portion that has a bolt insertion hole, through which the bolt shaft is inserted, and elasticity in a thickness direction, the impact absorbing plate portion being configured to come into abutment with the suspended plate-like portions of the hanger bracket in an elastically pressing manner in the locked state obtained with the fastening tool.

7. The steering device according to claim 2, wherein the stopper member and the bolt shaft are configured as separate members and the stopper member is configured to be fittable and attachable to the bolt shaft.

8. The steering device according to claim 2, wherein the telescopic regulating member is formed in the hanger bracket.

9. The steering device according to claim 2, wherein the telescopic regulating member is formed in the column pipe.

10. The steering device according to claim 2, wherein between the hanger bracket and the fastening tool of the outer column, an impact absorbing member is disposed, the impact absorbing member being provided with an impact absorbing plate portion that has a bolt insertion hole, through which the bolt shaft is inserted, and elasticity in a thickness direction, the impact absorbing plate portion being configured to come into abutment with the suspended plate-like portions of the hanger bracket in an elastically pressing manner in the locked state obtained with the fastening tool.

* * * * *